(12) United States Patent
Westermeier et al.

(10) Patent No.: US 10,886,511 B2
(45) Date of Patent: Jan. 5, 2021

(54) HOUSING FOR THE CELL STACK OF A BATTERY

(71) Applicant: Technische Universität München, Munich (DE)

(72) Inventors: Markus Westermeier, Munich (DE); Thomas Knoche, Freising (DE); Johannes Schmalz, Munich (DE); Jakob Kurfer, Großkarolinenfeld (DE)

(73) Assignee: Technische Universität München, Munich (DE)

( * ) Notice: Subject to any disclaimer, the term of this patent is extended or adjusted under 35 U.S.C. 154(b) by 229 days.

(21) Appl. No.: 15/531,207

(22) PCT Filed: Nov. 12, 2015

(86) PCT No.: PCT/EP2015/076454
§ 371 (c)(1),
(2) Date: May 26, 2017

(87) PCT Pub. No.: WO2016/083144
PCT Pub. Date: Jun. 2, 2016

(65) Prior Publication Data
US 2017/0317324 A1 Nov. 2, 2017

(30) Foreign Application Priority Data
Nov. 28, 2014 (DE) .......... 10 2014 117 547

(51) Int. Cl.
*H01M 2/10* (2006.01)
*H01M 10/6552* (2014.01)
(Continued)

(52) U.S. Cl.
CPC ....... *H01M 2/1077* (2013.01); *H01M 2/0237* (2013.01); *H01M 2/06* (2013.01);
(Continued)

(58) Field of Classification Search
CPC .................. H01M 2/1077; H01M 2/0237
See application file for complete search history.

(56) References Cited

U.S. PATENT DOCUMENTS 4,502,213 A * 3/1985 Madden ............... H01M 2/20
29/564.1
4,582,767 A 4/1986 Morioka et al.
(Continued)

FOREIGN PATENT DOCUMENTS

| CN | 203 574 014 U | 4/2014 |
|---|---|---|
| DE | 35 08 985 A1 | 9/1985 |
| DE | 10 2007 063188 A1 | 6/2009 |

*Primary Examiner* — Olatunji A Godo
(74) *Attorney, Agent, or Firm* — Budzyn IP Law, LLC

(57) ABSTRACT

The invention relates to a housing for a cell stack of a battery, comprising: an integral frame from accommodating the cell stack, wherein the frame surrounds at least three end faces of a cell stack which is accommodated in the housing, and at least one electrically conductive connecting element for establishing an electrical connection between an external connection and a cell stack which is accommodated in the housing is integrated in the frame; and a cover for covering sides, in particular all sides, of a cell stack which is received in the housing, which sides are not surrounded by the frame.

21 Claims, 4 Drawing Sheets

Figure 1:
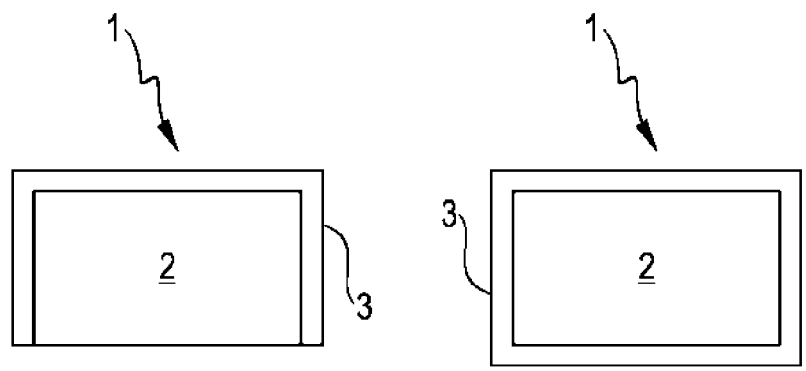

(51) Int. Cl.
*H01M 2/06* (2006.01)
*H01M 2/02* (2006.01)
*H01M 2/30* (2006.01)
*H01M 2/26* (2006.01)
*H01M 10/0525* (2010.01)
*H01M 10/48* (2006.01)
*H01M 2/04* (2006.01)
*H01M 10/42* (2006.01)

(52) U.S. Cl.
CPC ............. *H01M 2/266* (2013.01); *H01M 2/30* (2013.01); *H01M 10/0525* (2013.01); *H01M 10/486* (2013.01); *H01M 10/6552* (2015.04); *H01M 2/0277* (2013.01); *H01M 2/0482* (2013.01); *H01M 2/0486* (2013.01); *H01M 10/425* (2013.01); *H01M 10/48* (2013.01); *H01M 2220/20* (2013.01)

(56) References Cited

U.S. PATENT DOCUMENTS

| | | | |
|---|---|---|---|
| 2006/0091849 A1* | 5/2006 | Huynh | H01M 2/0242 320/112 |
| 2012/0040221 A1* | 2/2012 | Stoughton | H01M 2/1061 429/120 |
| 2012/0100413 A1 | 4/2012 | Okano et al. | |
| 2014/0302351 A1* | 10/2014 | Specht | H01M 10/4257 429/7 |
| 2014/0322582 A1* | 10/2014 | Ruter | H01M 2/1072 429/120 |

* cited by examiner

HOUSING FOR THE CELL STACK OF A BATTERY

The invention relates to a housing of a battery cell, in particular a housing for a cell stack of a battery.

In the context of electro-mobility and so-called renewable energies, high-performance and cost-effective energy accumulators are becoming increasingly important. A promising solution at present is represented by large-format lithium-ion cells. These are suitable for use, for example, in electric vehicles. However, there is still scope for improvement in terms of the cost and quality of such batteries.

From the technology of the prior art, for example, so-called prismatic hard-case lithium-ion cells are known, which essentially consist of a cell stack and a cover assembly, wherein the cell stack is electrically insulated from the usually metallic housing by an insulating layer. The function of the housing is to mechanically fix the cell stack and protect the cell stack from environmental influences. The cell stack contains all electro-chemical components of the cell and fulfils the function of reversible energy storage. The cell cover from the prior art is a functionally integrated component, which in addition to safety-related functions (e.g. pressure relief valve), in particular provides the electrical contacting of the two poles of the cell stack to the parent battery system. This is the means by which the cell cover ensures the insulation of the live electrical elements. In order to improve the gravimetric and volumetric energy density, the housing and the mounting base part of the cover are produced from thin-walled aluminium (0.6-1.2 mm).

The constructional design of prismatic hard-case cells has several disadvantages however:

The thin-walled housing and cover have a low mechanical rigidity. This results in increased amounts of material and time required for the assembly.

When joining the cover to the housing by welding, variations in the seam location and positioning can occur due to the thin wall thickness.

The use of metals, in particular aluminium, as the housing and the cover material makes electrical insulation of the live components necessary.

Due to the thin wall thickness, the integration of sealing and insulation elements is complicated from a design point of view.

The known design solutions for contacting the poles of the cell stack to the cover are time-consuming and, compared to other cell formats, e.g. pouch cells, lead to lower volumetric and gravimetric energy densities.

Conventional prismatic hard-case cells have a very small opening of only a few mm in diameter for filling the cell with electrolyte, which makes the filling operations time consuming.

In addition, due to the intercalation process in the electrodes, an expansion of the battery cells by approximately 10% can occur during charging and discharging. The large side faces of lithium-ion cells can therefore bulge out by up to 2 mm. This effect can be counteracted by means of external bracing, but due to the force of the bulging of the cells in operation, length expansions in the range of several mm can still occur in spite of the bracing.

In addition, manufacturing tolerances also present a challenge for the integration of battery cells in a battery module or battery system.

The geometrical variations resulting from the manufacturing tolerances and the expansion of the battery cells can give rise to the following problems in the design, assembly and operation of the battery modules:

The electrical contacting of the cell poles must compensate for manufacturing tolerances in the assembly, and in operation can compensate for a displacement of the poles due to the expansion of the cells.

Geometric variations in the electrical contacting can lead to increased contact resistances and hence a lower efficiency of the battery system.

Due to manufacturing tolerances, gaps can arise between the cells and a cooling system. These can be bridged with thermally conductive pastes; however, this can result in differences in the heat flows between the cooling system and the individual cells, which causes the cells to age at different rates and ultimately the service life of the battery system can be reduced.

Forces and moments, which occur either during installation or in operation due to the expansion of the cells or else result from driving operation, are transferred to the cell poles.

The poles of the cell cover of conventional batteries are used both for positioning of the otherwise free cell stack in the housing and also for the insulation, sealing and electrical contacting, both internally (to the cell stack) and externally (to the battery module). This means that the poles have no mobility at all, and all the relative movements between the cells and their parent structure of act on the cell poles in the form of forces and moments. In addition, forces and moments which act on the poles are transferred directly to the seal and the insulation. This can result in sealing and insulation problems and reduce the service life of the cell.

The housing and the diverters/voltage taps of the cell stack represent a structural redundancy, which leads to poor utilization of the available space.

The height of a cell (from the underside of the housing to the poles) is not defined until the cover assembly is joined to the housing, and is affected by the manufacturing tolerances of the cover and the housing and also by the joining process. The constructional design of conventional cells offers no opportunity to intervene in a controlled way before the joining process, except by a limited and time-consuming selection of suitable housings. After the joining procedure there is no possibility of correcting the cell height without unreasonable effort. Thus the manufacturing tolerances of the thin-walled housing and the fragile cover accumulate, and together with the joining process determine the height variations of the cells, which can lead to rejection in the final assembly stage of the cells or can make the module assembly more difficult.

The object of the invention is to solve, or at least alleviate, some of these problems. This object is achieved by the invention specified in the independent claims. Advantageous configurations can be found in the dependent claims.

In accordance with the invention a housing for a cell stack of a battery is created, comprising an integral frame for accommodating the cell stack, wherein the frame surrounds at least three end faces of a cell stack which is accommodated in the housing, and at least one electrically conductive connecting element for establishing an electrical connection between an external connection and a cell stack which is accommodated in the housing is integrated in the frame; and a cover for covering sides, in particular all sides, of a cell stack which is received in the housing, wherein said sides are not surrounded by the frame.

In accordance with the present invention, in contrast to the prior art the housing is not implemented as a thin-walled container, but as a frame structure, wherein functional components, such as the electrically conductive connection element for producing an electrical connection between the external connector and the cell stack, can be integrated into the frame. In addition, the frame structure enables a simpler integration of seals (e.g., flat seals) or insulation elements, which is advantageous in particular in the case of a frame and/or cover made of aluminium.

Such a frame structure also has a higher mechanical strength compared to the technology of the prior art. This enables enhanced handling ability and thus a simpler and faster assembly.

In addition, live conductors, in particular metallic ones, integrated into the frame structure contribute to the mechanical strength of the frame. In addition, the use of the frame as a structural and functional element also contributes to economies in terms of material. The integration of components in the framework also introduces space savings, which can ultimately be used to make improvements in the gravimetric and volumetric energy density.

Preferably, the frame is formed from plastic. In this way, the insulation of live components in the housing can be omitted. In addition, the use of plastic gives rise to a significant weight reduction.

In an alternative design the frame and/or the cover is/are made of metal, such as aluminium or a highly-alloyed steel.

In one design of the invention, the housing comprises a base plate, the frame extending along the outer edge of the base plate, so that by means of the base plate and the frame a recess for receiving a cell stack is formed, wherein the frame encloses all four end faces of a cell stack which is accommodated in the housing and the base plate covers an underside of a cell stack which is accommodated in the housing. The frame structure therefore forms the geometry of the cell stack to be accommodated in the housing, so that its centring, or exact positioning within the housing, is improved.

Preferably, the frame and the base plate are integrally designed, in particular from plastic. In this design, the housing is particularly torsionally rigid.

In one design the cover is fixed to an upper side of the frame, in particular glued, welded or sealed thereto. This can exploit the fact that on its top side the frame has a sufficiently broad overlap surface with the cover. This surface is available for attaching, for example welding, the cover to the frame. The large connection surface enables a high mechanical strength and sealing of the joint to be achieved.

In an alternative design, the cover can be formed by a composite film of a plurality of layers of thin plastic and metal foil (pouch foil).

In one design the housing comprises two cell poles, which are integrated in the frame and allow an electrical connection to an external battery module, wherein for each cell pole an electrically conductive connection element is provided for producing an electrical connection between the cell pole and a cell stack accommodated in the housing, and wherein each of the connection elements is integrated in the frame and/or extends within the frame, in particular along an end face of a cell stack accommodated in the housing from the corresponding cell pole up to a diverter on a cell stack accommodated in the housing. With this design, the available space is used particularly efficiently, leading to an increase in the volumetric energy density that is particularly valuable in electric vehicles.

The connecting element is preferably mechanically compliant, at least in some sections, and in particular in relation to torsion, bending and/or tension and compression. In this design the cell poles are moveable with respect to the cell stack. Relative movements between the cells and their parent structure are not transmitted—or at least only in a weak manner—to the cell poles or onto the cell stack. The mechanical strain on the cell poles and/or the cell stack is therefore reduced and the service life of the battery is increased.

In one design, in at least some sections the connection element has clearance within a cavity in the frame. Advantageously, this arrangement allows compensating movements of the connection element to be made, e.g. in the event of mechanical strain on the cell poles.

In a further development the connecting element comprises at least one conductive sliding sleeve and/or one conductive swivel bearing. This creates or improves kinematic degrees of freedom.

In a further development, at least one sensor, in particular a pressure or temperature sensor, and/or at least one cooling channel, in particular a heat-pipe, is/are integrated in the frame. The integration of such elements in the frame enables the assembly space to be particularly efficiently used.

In one design the cover is formed by a plastic or aluminium plate or a plastic or aluminium profile, or from a form-flexible plastic-aluminium composite foil or Kevlar. In this design, the cover is characterized by particularly high stability and/or flexibility.

Preferably, the frame comprises a rectangular cross section, which is designed as a solid profile or hollow profile, with or without ribbing. A frame designed in such a way is particularly stable and weighs relatively little.

The housing can comprise two cell poles which are integrated in the frame, wherein the cell poles are arranged on the same side or on opposite sides of the frame. This allows for a flexible arrangement of the housing and the integration of the cell poles in accordance with the requirements on the battery module.

In accordance with the invention furthermore, a method is created for producing a battery cell with a housing having one or a plurality of the features described above, comprising: a form-fitting arrangement of a cell stack in the frame so that the frame surrounds at least three end faces of the cell stack; and placing the cover of the frame on sides, in particular all sides of the cell stack, that are not surrounded by the frame.

In such a manufacturing process, the cell height can be adjusted as early as in the pre-assembly stage of the housing. In contrast to housings according to the prior art, the cell height is then no longer affected during the cell assembly. This results in lower vertical manufacturing tolerances, which subsequently brings with it significant advantages in the module assembly. Manufacturing tolerances in the horizontal plane can in turn be compensated by the mobility of the cell poles. Therefore, the module assembly is considerably simplified with respect to the state of the art.

In particular, the frame can be produced as an injection moulded component with an integrated conductor track (Moulded Interconnected Device, MID). In this design, additional seals can be omitted. Alternatively, the seals can be integrated into the frame during the production of the frame structure by the use of such an MID technology.

Figure 2:
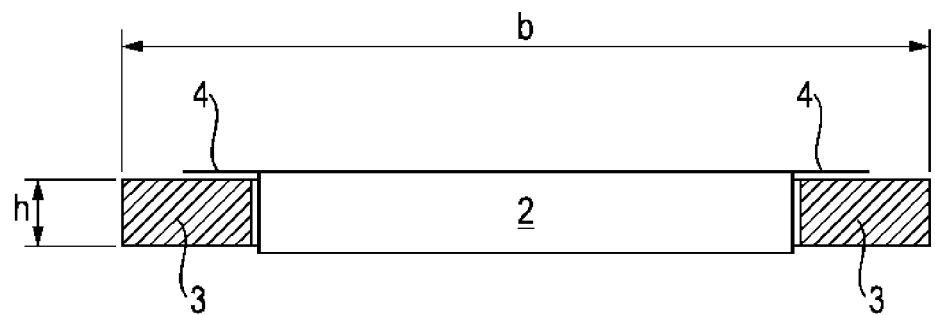
Figure 3:
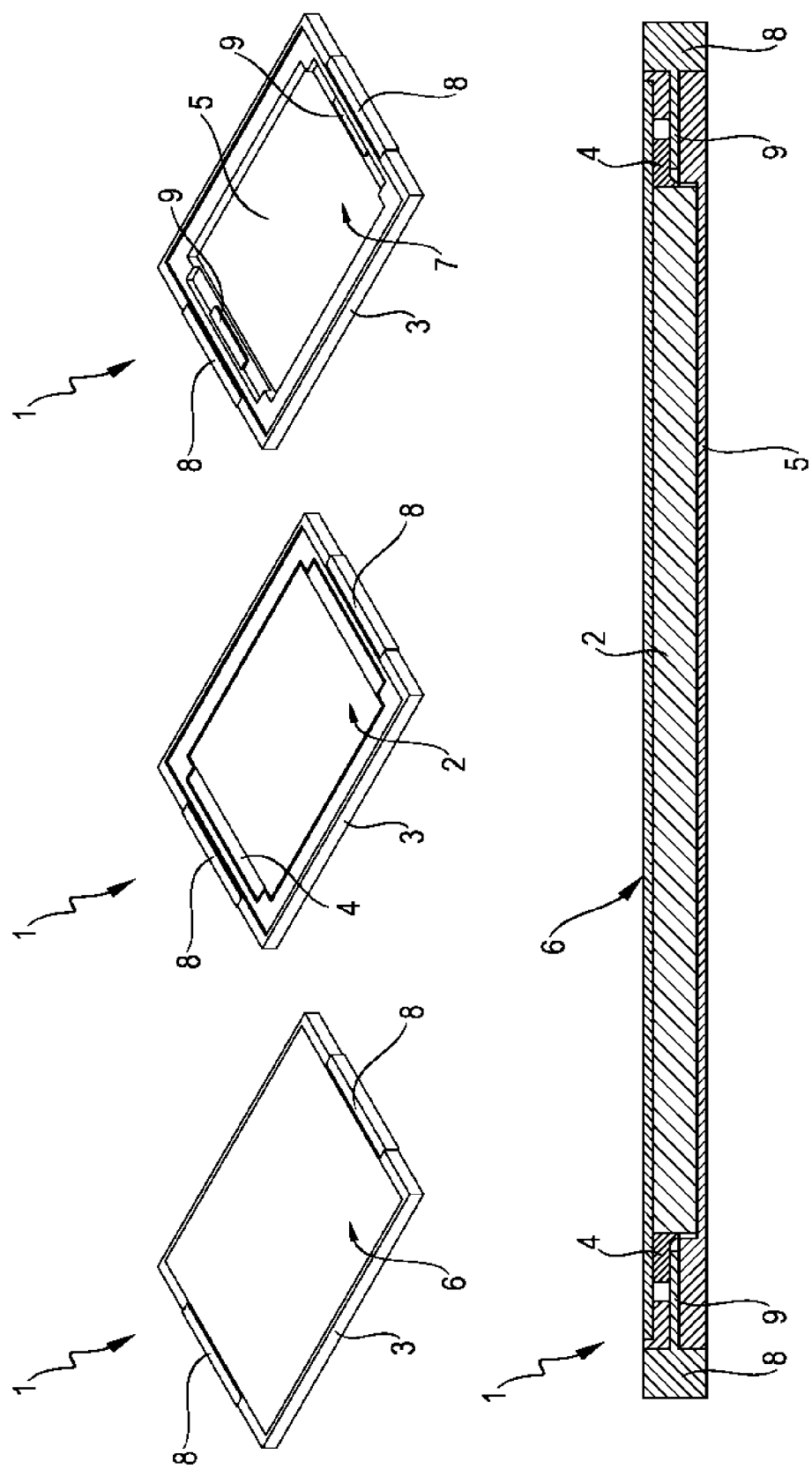
Figure 4:
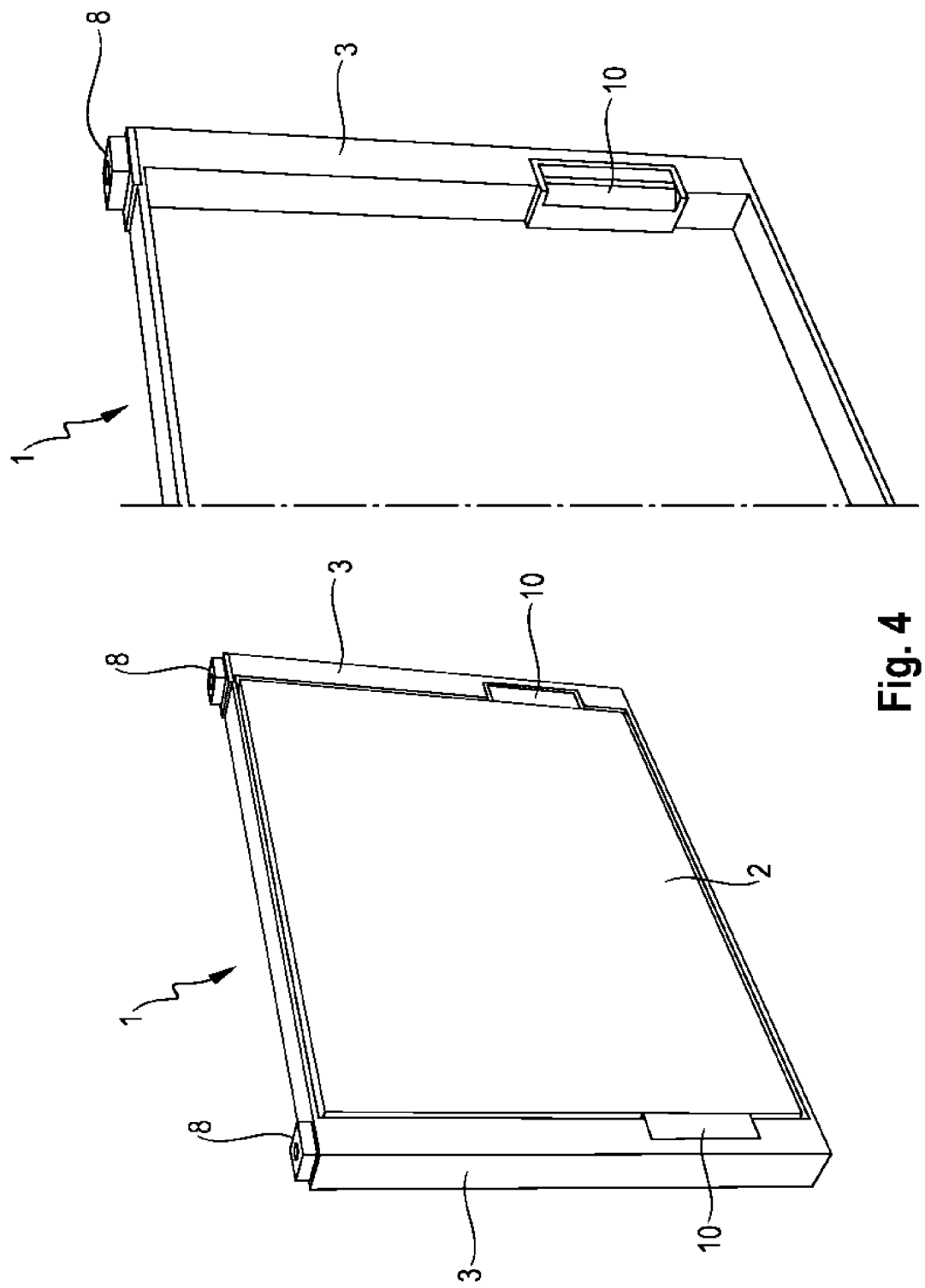
Figure 5:
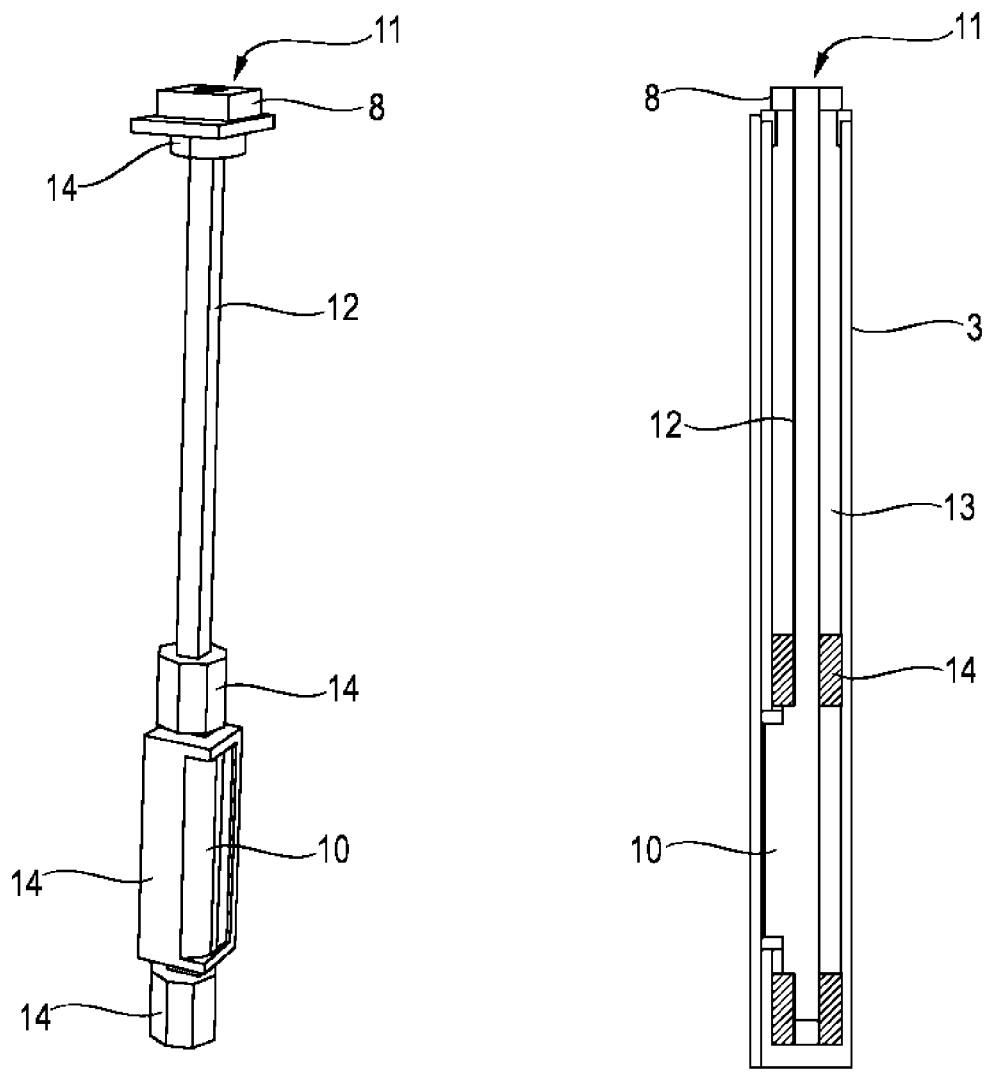

Hereafter, exemplary embodiments of the invention are described in greater detail by reference to the drawings. They show, in schematic representation:

FIG. 1 a housing for a cell stack of a battery according to two designs of the present invention;

FIG. 2 a cross-section through the housing of FIG. 1;

FIG. 3 a housing for a cell stack of a battery according to a further design of the present invention;

FIG. 4 a housing for a cell stack of a battery according to a further design of the present invention; and FIG. 5 a connection element for a housing according to FIG. 4, for producing an electrical connection between a cell pole and a cell stack which is accommodated in the housing.

FIG. 1 shows a plan view of a housing 1 for a cell stack 2 of a battery in two different designs. The housing 1 comprises an integral frame 3 for accommodating the cell stack 2, wherein in the design shown on the left the frame 3 surrounds three end faces of the cell stack 2, while in the design shown on the right the frame 3 surrounds all four outer end faces of the cell stack 2.

FIG. 2 shows a cross section through the housing 1 in accordance with FIG. 1. It can be seen there that the frame 3, in contrast to housings according to the prior art, is not designed as a thin-walled container but rather has a rectangular cross-section. A height h of the frame 3 substantially corresponds to the height of the cell stack 2. A width b of the frame 3 is greater than the width of the cell stack 2 with a diverter 4.

The cross-section of the frame 3 can be designed, as shown, as a solid profile. For the purposes of weight reduction however, in alternative versions the frame 3 can also be designed as a hollow profile or with ribbed structures. The frame preferably consists of plastic.

FIG. 3 shows a housing 1 according to a further design of the present invention. In this design the frame 3 surrounds all four outer end faces of a cell stack 2 accommodated in the housing 1. In addition, the four-sided frame 3 comprises an integrated base plate 5.

FIG. 3 shows the housing 1 in three different states. At the top left the housing 1 is shown with cell stack 2 accommodated therein, wherein the side of the housing 1 at the top of FIG. 3 is formed by means of a cover 6, which rests on the frame 3 and covers the cell stack 2 located in the housing 1.

On the right next to it, the housing 1 is shown with the cover 6 removed.

At the top right of FIG. 3 the housing 1 is shown without cover 6 and without cell stack 2. As can be seen here, the frame together with the base plate 5 forms a recess or cavity 7, into which the cell stack 2 can be inserted in a form-fitting manner.

The lower section of FIG. 3 shows a cross section of the housing 1 with cell stack 2 and cover 6.

The housing 1 comprises cell poles 8, which are arranged on opposite outer end faces of the housing 1. In an alternative design the poles 8 can also be arranged on the same end face of the housing 1. The cell poles 8 comprise electrically conductive extensions 9, which protrude into the interior of the housing, in particular into the recess 7. The diverters 4 of a cell pole 2 which is inserted into the housing 1 come to rest on these extensions 9, as can be easily identified in particular in cross-section through the housing 1.

This design has the advantage that, after inserting the cell stack 2 into the recess 7, the housing 1 is still open so that the process of filling with electrolyte is facilitated.

FIG. 4 shows a housing 1 for a cell stack of a battery in accordance with a further design of the present invention. In this design the two cell poles 8 are arranged on one side of the housing 1 (in the image orientation, the upper side). In the lower section of the housing 1, in each case one electrical connection 10 for the cell stack 2 is integrated into the frame 3 on opposite sides. The electrical connections 10 are electrically connected to the respective cell poles 8, wherein the electrical connection extends within the frame 3 and is integrated therein. The electrical connection 10 is connected to the diverters 4 of a cell stack 2 contained in the housing 1, so that an electrical connection between the cell poles 8 and the cell stack 2 is made.

FIG. 5 shows a component 11, by means of which the electrical connection between the cell poles 8 and the cell stack 2 can be made. The component 11 can be integrated in the frame 3 of the housing 1. The upper end of the component 11 is formed by the cell poles 8. From the cell poles 8, an electrically conductive and mechanically compliant connecting element 12 extends up to the electrical connection 10. In the region of the electrical connection 10, the connecting element 12 extends in the direction of the interior of the housing 1 and thus forms one of the extensions 9 shown in FIG. 3 for contacting to a diverter 4 of the cell stack 2.

The region of the electrical connection 10 can be arranged at any desired level of the cell stack 2. In the design shown in FIGS. 4 and 5 the cell poles 8 are located on an (upper) end face of the housing 1, while the electrical connection 10 is arranged closer to the opposite (lower) end face of the housing 1.

The connecting element 12 extends within a cavity 13 in the frame 3. Inside the hollow space 13 the connection element 12 has a predefined amount of clearance, so that forces acting on the cell poles 8 can be compensated for by movement of the connection element 12 within the cavity 13.

At various points the component 11 comprises electrical insulations or seals, which fix the connection element 12 within the frame 3 and electrically insulate it from the cell stack 2.

The component 11 enables a separation of the functions "electrical contacting to the battery module" from the other functions, in particular the functions "insulation", "sealing", "positioning of the cell stack" and "electrical contacting of the cell stack". The poles 8, as the carrier of the function "electrical contacting to the battery module", can have kinematic degrees of freedom. The bridging of the spatially separated functional units is carried out with electrically conductive connection elements. These can implement additional functions, e.g. safety functions using over-current resistors and the like. The connection elements can have kinematic degrees of freedom, either inherent to the components, for example due to their geometrical shape, or due to additional elements, such as conductive swivel bearings or sliding sleeves. In particular, the connection elements can have a defined mechanical compliance with regard to torsion, bending or axial tension/compression. This compliance can be adjusted by the design of the connection to the named functional units, either by their geometry or by their material. The connection elements can consist of different materials.

Due to the invention, depending on the particular design, the following benefits are obtained:

Due to the separation of the functional units the poles of the cell housing can be designed to be movable while maintaining the sealed property of the cell. This means that relative movements (arising from the operation/from the assembly/due to the length expansion) between the cells and their parent structure do not act, or at least only in a weakened form, on the cell poles or on the cell stack and the seals and insulations in the form of forces and moments.

The parallelization of the horizontally viewed arrangement of housing/diverter/diverter terminals—cell stack—diverter terminals/diverter/housing leads to a better utilization of the available space in the housing and thus to an increase in the volumetric energy density, which is valuable in electric vehicles.

The arrangement of the cell seals and insulations in the housing, as shown in FIG. 5, also leads to a higher utilization of the available installation space, or to more installation space, for integrating the seals and insulations. Accordingly, the use of less expensive or better functioning components is enabled.

The arrangement of the seals and insulations in the chassis allows these to be spatially separated from the weld seam between the cover and housing and therefore reduces the risk of damage to the seals and insulations during the joining process.

With the invention the cell height in the housing can be precisely adjusted in the housing pre-assembly (e.g. by vertical displacement of the terminals on the diverter before the joining process). In contrast to housings according to the prior art, the cell height is then no longer affected in the cell assembly. This results in less waste due to rejects in the cell assembly, and to significantly lower vertical manufacturing tolerances, which brings with it significant advantages in the module assembly.

The manufacturing tolerances in the horizontal plane can be compensated for by the mobility of the cell poles. Thus, in spite of variations in the housing geometry the module assembly is made significantly easier.

LIST OF REFERENCE NUMERALS 1 housing
2 cell stack
3 frame
4 diverter
5 base plate
6 cover
7 recess
8 cell poles
9 extensions of the cell poles
10 electrical connection
11 component
12 connection element
13 cavity
14 insulations

The invention claimed is:

1. An assembly comprising a housing and a cell stack of a battery, the housing comprising:
an integral frame for accommodating the cell stack, wherein the frame surrounds at least three end faces of the cell stack which is accommodated in the frame;
first and second cell poles integrated in the frame, the first and second cell poles each including at least one electrically conductive connecting element integrated in the frame, configured to establish an electrical connection, through a portion of the frame, between an external connection and the cell stack which is accommodated in the frame; and
a cover for covering at least one side of the cell stack accommodated in the frame which is not enclosed by the frame,
wherein each of the at least one electrically conductive connection elements includes at least one conductive sliding sleeve to allow the corresponding at least one electrically conductive connection element to be mechanically compliant in at least one kinematic degree of freedom in response to one or more of torsion, bending, and axial tension/compression.

2. The assembly according to claim 1, wherein the frame is formed of at least one of plastic and metal.

3. The assembly according to claim 1, wherein the housing (1) further comprises a base plate, the frame extending along the outer edge of the base plate, so that by means of the base plate and the frame a recess is formed for accommodating the cell stack, wherein the frame surrounds all four end faces of the cell stack which is accommodated in the frame and the base plate covers an underside of the cell stack which is accommodated in the frame.

4. The assembly according to claim 3, wherein the frame and the base plate are integrally formed.

5. The assembly according to claim 3, wherein the cover is fixed to an upper side of the frame.

6. The assembly according to claim 1, wherein, for the first cell pole, at least in some sections, the corresponding at least one electrically conductive connection element has clearance within a cavity in the frame.

7. The assembly according to claim 1, wherein, for the first cell pole, the corresponding at least one electrically conductive connection element further comprises at least one conductive swivel bearing.

8. The assembly according to claim 1, wherein at least one sensor is integrated in the frame.

9. The assembly according to claim 1, wherein the cover is formed by at least one or more of: a plastic plate, and a metal plate.

10. The assembly according to claim 1, wherein the frame comprises a rectangular cross-section.

11. The assembly according to claim 1, wherein the first and second cell poles are arranged on opposite sides of the frame.

12. A method for producing a battery cell, the method comprising:
providing a housing including an integral frame and a cover, wherein the housing includes first and second cell poles integrated in the frame, the first and second cell poles each including at least one electrically conductive connecting element integrated in the frame configured to establish an electrical connection, through a portion of the frame, between an external connection and the cell stack arranged in the frame, and wherein each of the at least one electrically conductive connecting elements includes at least one conductive sliding sleeve to allow the corresponding at least one electrically conductive connection element to be mechanically compliant in at least one kinematic degree of freedom in response to one or more of torsion, bending, and axial tension/compression;
form-fitting arrangement of a cell stack in the frame, so that the frame surrounds at least three end faces of the cell stack; and
placement of the cover on the frame on at least one side of the cell stack which is not enclosed by the frame.

13. The method according to claim 12, wherein the frame is produced as an injection moulded component with an integrated conductor track (Moulded Interconnected Device, MID).

14. The assembly according to claim 5, wherein the cover is fixed to the upper side of the frame by one or more of: gluing, welding, and sealing.

15. The assembly according to claim 1, wherein each of the at least one electrically conductive connection elements extends within the frame from the corresponding cell pole up to a diverter on the cell stack accommodated in the frame.

16. The assembly according to claim 8, wherein the at least one sensor is at least one or more of: a pressure sensor, and a temperature sensor.

17. The assembly according to claim 1, wherein at least one cooling channel is integrated in the frame.

18. The assembly according to claim 17, wherein the cover is formed by at least one or more of: an aluminum plate, a plastic profile, a metal profile, form-flexible plastic-metal composite foil, and Kevlar.

19. The method according to claim 12, wherein the housing includes a base plate fixed to the frame so that a recess is formed for accommodating the cell stack.

20. The method according to claim 19, wherein the base plate covers an underside of the cell stack and the cover covers an upper side of the cell stack.

21. The method according to claim 12, wherein, for the first cell pole, at least in some sections, the corresponding at least one electrically conductive connection element has clearance within a cavity in the frame.

\* \* \* \* \*